United States Patent [19]

Ronen

[11] Patent Number: 5,701,442
[45] Date of Patent: Dec. 23, 1997

[54] METHOD OF MODIFYING AN INSTRUCTION SET ARCHITECTURE OF A COMPUTER PROCESSOR TO MAINTAIN BACKWARD COMPATIBILITY

[75] Inventor: Ronny Ronen, Haifa, Israel

[73] Assignee: Intel Corporation, Santa Clara, Calif.

[21] Appl. No.: 530,614

[22] Filed: Sep. 19, 1995

[51] Int. Cl.$^6$ ............................................. G06F 9/30
[52] U.S. Cl. ............................................. 395/500
[58] Field of Search ................... 395/376, 500, 395/800, 385, 568

[56] References Cited

U.S. PATENT DOCUMENTS

| | | | |
|---|---|---|---|
| 3,889,242 | 6/1975 | Malmer, Jr. | 395/388 |
| 3,918,030 | 11/1975 | Walker | 395/388 |
| 5,396,604 | 3/1995 | DeLano et al. | 395/375 |
| 5,410,682 | 4/1995 | Sites et al. | 395/800 |
| 5,469,551 | 11/1995 | Sites et al. | 395/375 |
| 5,471,602 | 11/1995 | DeLano | 395/445 |
| 5,517,436 | 5/1996 | Andreas et al. | 364/736 |

OTHER PUBLICATIONS

*Computer Architecture A Quantitative Approach*, Morgan Kaufmann Publishers, Inc. First Edition, Chapters 3 and 4; 1990.

*Computer Architecture A Quantitative Approach*, Morgan Kaufmann Publishers, Inc., Second Edition, Chapter 2 and Appendix D; 1996.

"Pentium® Processor User's Manual. vol. 3: Architecture and Programming Manual", (NOP & XCHG instruction Listings and Appendix A; 1994).

*Primary Examiner*—Kevin J. Teska
*Assistant Examiner*—Dan Fiul
*Attorney, Agent, or Firm*—Blakely, Sokoloff, Taylor & Zafman

[57] ABSTRACT

A method of processor architecture modification includes the step of defining an instruction set architecture for a current generation processor. Reserved within this definition are a set of instructions which perform no-operations (NOPs), have no attached semantics, and do not change any architectural state of the processor. Software code, compatible with the instruction set architecture, is then written for running on the processor. In a next-generation processor, new functionality is added by defining a semantic for one of the NOPs so that programs which utilize the new instruction run on both the current-generation and the next-generation processors.

13 Claims, 2 Drawing Sheets

METHOD OF MODIFYING AN INSTRUCTION SET ARCHITECTURE OF A COMPUTER PROCESSOR TO MAINTAIN BACKWARD COMPATIBILITY

FIELD OF THE INVENTION

The present invention relates generally to the field of computers and microprocessors. More particularly, the invention relates the design and modification of an instruction set architecture of a processor.

BACKGROUND OF THE INVENTION

The world has witnessed remarkable advances over the past several decades in the field of computer design and architecture. One of the most significant innovations during that time was the development of the microprocessor, which is essentially a computer self-contained on a silicon chip.

Microprocessors have made it possible to execute computer programs and other software routines for a myriad of industrial applications. To do this, a processor executes software programs in accordance with a defined instruction set architecture (ISA). The ISA of a particular processor defines the set of available instructions that may be incorporated into a program for execution on the processor. When writing a program to be run on a certain processor, programmers must first familiarize themselves with the set of instructions defined in the ISA, and then construct an ordered sequence of particular instructions to carry out tasks and operations which accomplish the desired goal. By way of example, following the introduction of the Intel® 8086 microprocessor, a large number of computer programs were written specifically for running on the 8086 processor; that is, in accordance with the ISA defined by that machine.

Ever since the introduction of the first microprocessor, there has been a problem with the rapid obsolescence of software which supports an existing generation of machine. Technological advances tend to occur quickly, so that in a very short time an existing or current generation processor is surpassed by a new, improved version of the same processor, i.e., the next generation processor. As a result, software developers continually face the difficulty of writing code that takes advantage of new features and performance capabilities of the processor hardware.

The problem is that for each new generation of microprocessor, new instructions are added to the instruction set architecture that implement new operations. Software developers, however, commonly refrain from employing these new instructions for many years. The reason is because using a new instruction generally makes their code incompatible with previous or current generation processors. At the time a new processor is introduced, the previous or current generation processors typically have widespread acceptance and usage in the marketplace. Therefore, it makes good business sense to write programs that remain compatible with present machines, at least until a large number of users migrate to the newer processor. Unfortunately, this means that many advanced features and capabilities go largely unused for quite some time. This, of course, impedes further technological advancement.

To illustrate how this problem has slowed progress in the computer arts, one may consider the Intel i486™ processor, which was introduced in 1989. The Intel i486™ processor was an improvement of the widely popular Intel i386™ processor. One of the improvements was the introduction of a new instruction known as the BSWAP instruction. The BSWAP instruction satisfied a long-felt need in the computer field for performing rapid byte swapping operations on 32-bit quantities. With the BSWAP instruction a user could quickly convert little/big endian data in a register to the opposite (i.e., big/little) endian form.

Although the BSWAP instruction was heralded as an important innovation, much of the software written for the i486™ processor did not use this instruction for the simple reason that it was not supported by the i386™ processor. In other words, programmers were reluctant to use the BSWAP instruction because doing so would render their code incompatible with the already large installed base of computer software written for i386™ processors. Only recently—many years after the introduction of the i486™ processor—have software developers begun to take advantage of the BSWAP instruction.

Therefore, what is needed is a solution to this problem so that once a new processor is introduced, software can immediately be written for that processor that takes advantage of new instructions while remaining compatible with code written for previous or current generation processors.

SUMMARY OF THE INVENTION

In accordance with the present invention, a method of processor architecture modification is provided for increased performance based on greater software compatibility and extensions. In one embodiment, the method includes the step of first defining an instruction set architecture for a current generation processor. Within this definition are reserved a set of "hintable" instructions which perform no-operations (NOPs). Each of the "hintable" NOPs has a unique opcode. From an architectural standpoint, the "hintable" NOPs have no attached semantics and do not alter an architectural state of the processor. This is true as long as the instruction set architecture is in use on that processor.

Over the course of time, software developers and programmers will inevitably write code for execution on the processor. Of course, these programs must be compatible with the instruction set architecture running on the processor. After a period of time a large base of software programs may be established.

When a next generation processor is developed, innovative new features are implemented by adding new instructions to the ISA. According to the invention, an associated semantic is defined for at least one of the "hintable" NOPs to implement the new instruction in the next generation processor. In this manner, software code may use the hintable NOP instruction to run programs on the next generation processor. In other words, the hintable NOPs are compatible with earlier versions of the processor. The same program is also compatible with (i.e., can run on) the current generation processor. Thus, newly generated code using the new instruction (or instructions) is able to run on both the new and old processor generations.

BRIEF DESCRIPTION OF THE DRAWINGS

The novel features which are characteristic of the present invention are set fourth in the appended claims. The invention itself, however, as well as other features and advantages, is best understood with reference to the detailed description which follows, read in conjunction with the accompanying drawings wherein:

DETAILED DESCRIPTION

As improvements are made in the development of future generation microprocessors, software compatibility issues naturally arise. Compatibility means that, within certain limited constraints, programs that execute on any previous generations of compatible microprocessors will produce identical results when executed on a next generation processor. There are, however, slightly different implementations of architectural features. More importantly, newer processors typically add functionality through innovative instructions and other features to the instruction set architecture which did not exist in previous generations. As a result, software developers intent upon writing programs which utilize these new instructions must accept, as a consequence, that such programs would be incompatible with prior generation processors. To avoid this problem, many software vendors have refrained from including new instructions and exploiting architectural features in their code until existing microprocessor families have obsolesced.

An example of how instruction set architectures change with improvements in microprocessor design is found in the evolution of the Intel processor architecture. In 1979, Intel introduced the 8086 and the 8088 CPUs which implemented a basic, rudimentary instruction set architecture. This was followed in 1982 by the introduction by the 80286 CPU. In 1985, the i386™ processor provided a variety of new instructions; these included LSS, LFS, LGS instructions, bit scan instructions, double-shift instructions, and a generalized multiply instruction.

Several years later, in 1989, the i486™ processor introduced three new application instructions: BSWAP instruction, for converting from little/bit endian to big/little endian formats; XADD instruction, which loads the destination register dest into the source register src and then loads the sum of dest and the original value of src into dest; and CMPXCHG compare exchange instruction, which compares the accumulator with a dest, if they are equal src is loaded into dest, otherwise dest is loaded into the accumulator. The i486™ processor also introduced three new system instructions (INVD, WBINVD, INVLPG) for managing the cache and translation look-aside buffer (TLB).

Most recently, the Pentium® processor was introduced in 1993. The Pentium® processor offered a variety of new instructions for 32-bit machines.

Figure 1:
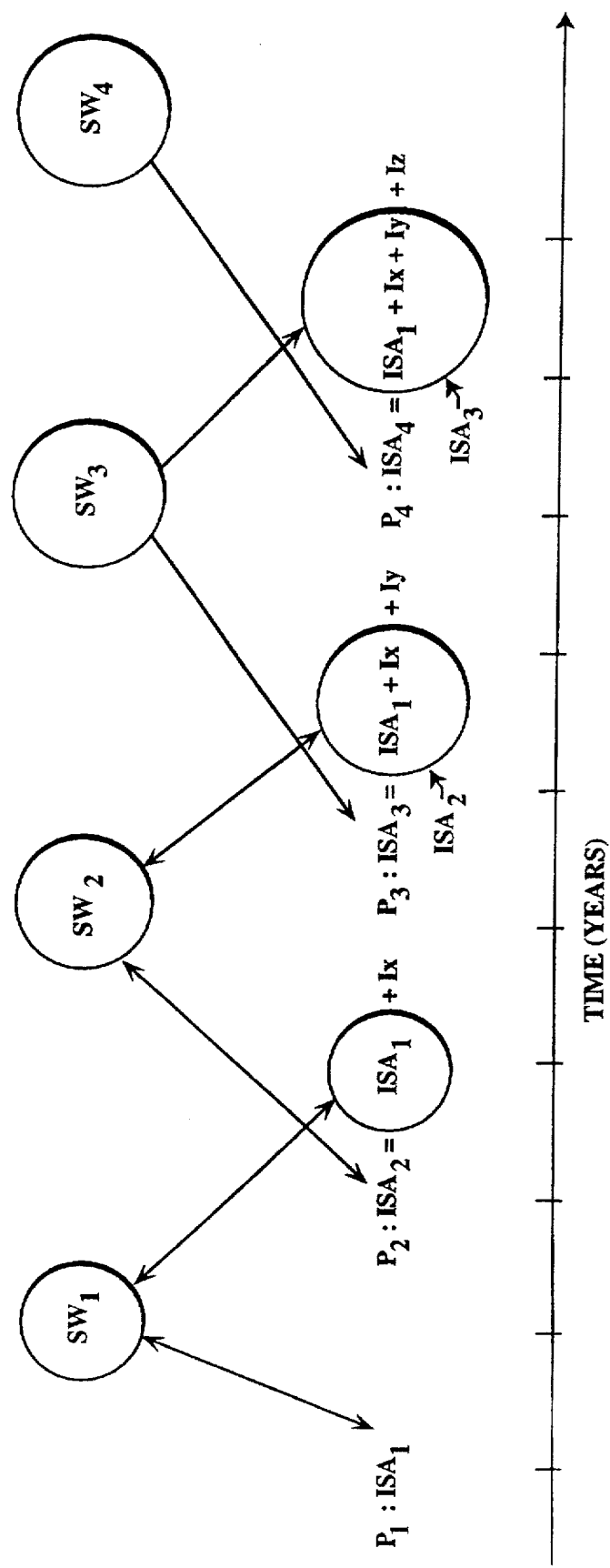
FIG. 1 illustrates improvements in processor architecture and software development over the course of time.

FIG. 1 provides an example of how processor architecture and software code develop evolve over time. In FIG. 1, the notations $P_1$, $P_2$, etc., refer to successive generations of microprocessors. Each new generation builds on the previous generation by adding new instructions and features to the instruction set architecture incorporated in the prior generation machine. Thus, the notation $ISA_1$ refers to the instruction set architecture developed for, and compatible with, processor $P_1$.

Processor $P_2$ has an associated instruction set architecture $ISA_2$ consisting of the previous generation architecture ($ISA_1$) plus some new functionality, which may be added by defining new instructions. These additional instructions for processor $P_2$ are represented by the notation $I_x$ in FIG. 1. Similarly, new instructions incorporated in future generations processors $P_3$ and $P_4$ are shown by instructions $I_y$ and $I_z$, respectively. As can be seen, the development of improved processors generally means the addition of new features and instructions which expand the basic instruction set architecture.

Following the introduction of a new microprocessor, a body of software programs is normally written so that, over time, a library of application programs is established for a particular instruction set architecture. Development of new software is usually spurred by consumer demand following the build-up of a sufficiently large processor & platform base. This is shown in the example of FIG. 1 by the circled notations $SW_1$, $SW_2$, $SW_3$ and $SW_4$. The body of software, $SW_1$ is written for the corresponding instruction set architecture; namely, $ISA_1$. Likewise, software $SW_2$, $SW_3$ and $SW_4$ are written to take advantage of the instructions defined in architectures $ISA_2$, $ISA_3$ and $ISA_4$, respectively. Note that the development of the software base for a particular instruction set architecture usually occurs well after the introduction of the processor (e.g., $SW_1$ follows $P_1$, etc.).

As technology advances, an improved version of the original $P_1$ processor is inevitably developed. In the example of FIG. 1 this improved version is shown as processor $P_2$. Processor $P_2$ provides extensions to the instruction set architecture of its predecessor. These extensions typically include several new instructions, $I_x$. Typically, a newer generation processor attempts to maintain "backward-compatibility" with previous processor generations so that the existing base of software programs can run on the newer generation processor. This is shown in FIG. 1 by the arrow between software based $SW_1$ and the portion of the new instruction set architecture which is compatible with the earlier generation. Hence, the representation $ISA_2=ISA_1+I_x$.

It should be understood, however, that while the improved processor $P_2$ remains software compatible with its predecessor generation, the software base $SW_1$ may not be able to take advantage of the features and extensions specific to the newer processor. In this case, software programs contained within $SW_1$ cannot execute instructions $I_x$ without modification. Hence, at some point programmers need to develop new code sequences in order to take advantage of the full functionality of the new instruction set architecture. Unfortunately, in the past this has meant waiting for long periods of time—on the order of years in some cases—for new software programs to be written that use the new processor's new instructions. FIG. 1 illustrates this problem by way of example, wherein a body of new software programs $SW_2$ is not produced until well after the introduction of the instruction set architecture $ISA_2$ for processor $P_2$.

FIG. 1 also illustrates the establishment of software programs $SW_3$ compatible with the instruction set architecture written for processor $P_3$ (i.e., $ISA_3$), and some earlier versions. But as can be seen, programs $SW_3$ do not take advantage of the new instructions $I_z$ defined in processor $P_4$. Because new application programs tend not to use new instructions following the introduction of a new processor, there has been a disincentive to add instructions in a new instruction set architecture. The reason is because new software code that could utilize the newly defined instructions would not execute on previous or current generation processors. Hence, progress is stymied.

In accordance with the present invention, this problem is overcome by a method which includes adding a set or a family of instructions called "hintable" NOPs to a processor's ISA. (Hintable NOPs are distinguished from ordinary hint instructions which utilize bits to supply a clue to hardware as to how to treat a particular block of data or address.) The hintable NOP instructions are, from an architectural viewpoint, inconsequential. That is, these instructions behave as true "no-operation" instructions and have no architectural effect on the microprocessor. From an architectural viewpoint, execution of a hintable NOP instruction does absolutely nothing. It does not change the register files or state of the processor.

Furthermore, according to the invented method, no semantic is attached to the hintable NOP instructions in the current generation processor. In other words, the hintable NOPs simply occupy "space" in the ISA of the processor for which it is defined. From an architectural standpoint, it is sufficient to ensure that the hintable NOP instructions remain "no-operations" for the life of the corresponding instruction set architecture.

Typically, once a processor has been introduced, development work begins on the next generation machine. Of course, a considerable time passes before the newer, improved processor becomes commercially available. During this time, however, the number of software programs written for the current generation processor greatly expands. Naturally, these software programs are written to be compatible with the particular instruction set architecture defined for the current processor.

According to the invention, the next step is to attach an actual microarchitecture semantic "hint" to one or more of the NOP instructions in the next generation processor. The attached semantic is added to the instruction so that it can be used to boost performance, decrease power, or perform other new and useful operations. The exact semantic need not be defined at the time the hintable NOP instruction is created in the current generation processor; rather, it is defined and implemented in the future generation of the processor family.

Once the semantic has been defined and implemented for a particular instruction, new software programs can immediately take advantage of it. This means that newly generated software code may use these instructions to run on both new and older processor generations that support this new instruction set architecture.

To recapitulate, the basic concept of the invention is to first reserve a set of currently unused no-operation instructions. These instructions create a "space" in the architecture for future, yet-to-be-seen improvements. Semantics can then be defined in a future generation processor for one or more of the hintable NOPs previously allocated in the architecture. The semantics for the NOPs implement a particular new instruction or operation. Using this method ensures continuous compatibility across several generations of the same processor family and eliminates barriers to developing new applications.

Figure 2:
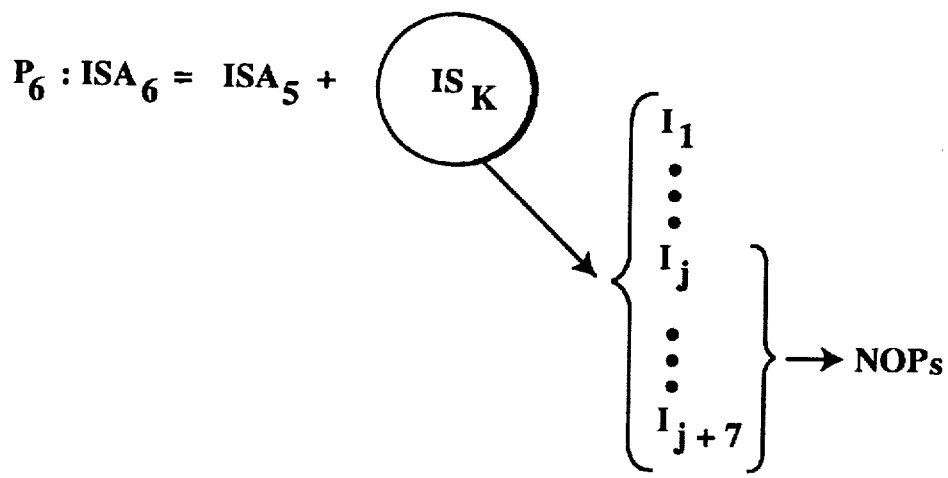
FIG. 2 illustrates the definition of hintable NOPs for an instruction set architecture according to one embodiment of the present invention.
Figure 3:
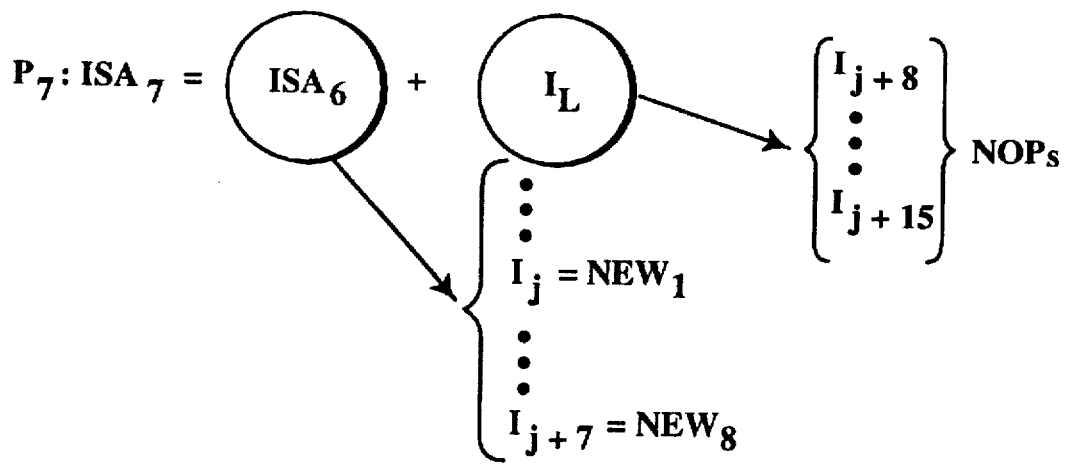
FIG. 3 illustrates a next generation processor implementation of new instructions by attaching semantics to NOPs added to the previous instruction set architecture.

The invention is illustrated in the conceptual notations of FIGS. 2 and 3. FIG. 2 shows the creation of a new processor $P_6$ having an instruction set architecture $ISA_6$ that is an improvement over the previous or current generation processor. In FIG. 2, the current generation processor is represented by $ISA_5$, wherein the improvement comprises additional instructions $IS_k$. The set of instructions $IS_K$ includes reserved instructions $I_j$ through $I_{j+7}$. (Note that in this example the number of instructions reserved is arbitrarily chosen to be eight. This, however, should not be construed as limiting the number of hintable NOPs that may be defined at any time. In other words, the number of hintable NOPs added to an instruction set architecture may be any number.)

As shown, these reserved instructions ($I_j$ through $I_{j+7}$) are no-operation instructions (NOPs). They have no semantics and execution of any one of them does not alter an architectural state of the processor. In one embodiment of the present invention, each of the hintable NOPs has a unique opcode. For example, instructions $I_j$ through $i_{j+7}$ may have respective opcodes 0X0F18 through 0X0F1F, in hexadecimal notation.

After some time a new future generation processor will be developed. FIG. 3 shows new processor $P_7$ having a corresponding instruction set architecture $ISA_7$. As before, $ISA_7$ consists of additional instructions $I_L$ added to the previous instruction set architecture ($ISA_6$). At this point, however, actual microarchitectural semantics of one or more of the previously reserved instructions $I_j$ through $I_{j+7}$ are defined and implemented. This is shown in FIG. 3 wherein $I_j$=NEW$_1$ ... $I_{j+7}$=NEW$_8$.

It is appreciated that the function performed by the new instructions in the next generation processor $P_7$ need not be known at the time of the development of processor $P_6$. In other words, the various operations and functions implemented by instructions NEW$_1$ through NEW$_7$ may comprise innovative functions that would increase performance of the processor. For example, one can imagine new instructions that perform certain data prefetching functions whereby data is prefetched from a secondary level cache (L2) and stored in a primary or first level data cache (L1). Another possibility is to implement an instruction that provides branch prediction hints to allow a CPU to achieve higher performance.

Yet another aspect of the present invention involves the possibility of adding a second new set of reserved NOP instructions to the instruction set architecture defined for processor $P_7$. FIG. 3 illustrates this as additional instructions $I_{j+8}$ through $I_{j+15}$. In accordance with the previous discussion, these instructions are reserved as currently unused instructions, but which may be used in future processor generations to implement some useful function. Practitioners in the art will therefore appreciate that the method of the present invention allows software developers and programmers to immediately take advantage of new extensions and functionality following the introduction of a new processor.

With continuing reference to the examples of FIGS. 2 and 3, following the introduction of processor $P_7$, a programmer may write code which uses instruction NEW$_1$ without suffering compatibility problems with old processor generations. Stated another way, code written for processor $P_7$ which uses instruction NEW$_1$ would run on processor $P_6$; therefore making use of the new instruction strongly attractive to those who write code.

While the method of the present invention has been described in connection with certain embodiments and examples, it should be understood that the broad concept embodied in the invention is not limited to these examples. For instance, whereas in one embodiment the new instructions may assume a standard MOD/RM format of the Intel architecture, other embodiments of the invention may assume different formats compatible with different families of processors. Moreover, the invention is not considered to be limited strictly to complex instruction set or CISC processors. The invention is equally applicable to reduced instruction set or RISC processors. Therefore, the invention is applicable to all types of data processors.

I claim:

1. A method of processor architecture modification comprising the steps of:

(a) defining an instruction set architecture (ISA) for a current generation processor which includes a plurality of no-operation instructions (NOPs) having no associated semantics, and wherein execution of any one of the NOPs does not alter an architectural state of the processor;

(b) waiting until software programs have been written that are compatible with the ISA and which run on the current generation processor;

(c) defining, for at least one of the NOPs, an associated semantic that implements a new instruction in a next generation processor, the next generation processor being an improvement of the current generation processor, such that a new software program that uses the new instruction and which runs on the next generation processor, also runs on the current generation processor.

2. The method according to claim 1 wherein each of the NOPs has a unique opcode.

3. The method according to claim 2 wherein the plurality of NOPs comprise eight NOPs.

4. The method according to claim 3 wherein the unique opcodes of the eight NOPs are represented in hexadecimal notation as 0X0F18 to 0X0F1F.

5. An architecture for a processor which defines a set of instructions that can be incorporated into a program for execution on the processor, the set of instructions including a plurality of no-operation instructions (NOPs), each having a unique opcode and no associated semantics, and wherein execution of any one of the NOPs does not alter an architectural state of the processor;

the NOPs being available for use in an improved version of the processor, wherein definition of an associated semantic for at least one of the NOPs in the improved version implements a new instruction that specifies a new operation.

6. The architecture of claim 5 wherein the new operation alters the architectural state of the improved version of the processor.

7. The architecture of claim 5 wherein the plurality of NOPs comprise eight NOPs.

8. The architecture of claim 7 wherein the unique opcodes of the eight NOPs are represented in hexadecimal notation as 0X0F18 to 0X0F1F.

9. The architecture of claim 5 wherein the new instruction can be incorporated into newly-generated code that is able to run on both the processor and the improved version of the processor.

10. A processor having an architecture which defines a set of instructions that can be incorporated into a program for execution thereon, the set of instructions including a plurality of no-operation instructions (NOPs), each having a unique opcode and no associated semantics, and wherein execution of any one of the NOPs does not alter an architectural state of the processor;

the processor being operable to execute code which includes a new instruction, the code also being executable on a next-generation processor having a new architecture which includes the set of instructions, but with an associated semantic that implements the new instruction for at least one of the NOPs.

11. The processor of claim 10 wherein execution of the new instruction alters the architectural state of the next-generation processor.

12. The processor of claim 10 wherein the plurality of NOPs comprise eight NOPs.

13. The processor of claim 12 wherein the unique opcodes of the eight NOPs are represented in hexadecimal notation as 0X0F18 to 0X0F1F.

* * * * *